(12) United States Patent
Grimminger et al.

(10) Patent No.: US 12,034,809 B2
(45) Date of Patent: Jul. 9, 2024

(54) COUPLING A DOMESTIC APPLIANCE TO A MOBILE DEVICE

(71) Applicant: BSH Hausgeräte GmbH, Munich (DE)

(72) Inventors: Jochen Grimminger, Dillingen (DE); Philipp Kleinlein, Bergen (DE); Philip Koene, Munich (DE); Frank Schaefer, Puchheim (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 18/041,578

(22) PCT Filed: Oct. 11, 2021

(86) PCT No.: PCT/EP2021/078021
§ 371 (c)(1),
(2) Date: Feb. 14, 2023

(87) PCT Pub. No.: WO2022/089926
PCT Pub. Date: May 5, 2022

(65) Prior Publication Data
US 2023/0291800 A1 Sep. 14, 2023

(51) Int. Cl.
*H04L 67/125* (2022.01)
*H04L 12/12* (2006.01)
*H04M 1/72415* (2021.01)

(52) U.S. Cl.
CPC ............ *H04L 67/125* (2013.01); *H04L 12/12* (2013.01); *H04M 1/72415* (2021.01)

(58) Field of Classification Search
None
See application file for complete search history.

(56) References Cited

U.S. PATENT DOCUMENTS

| | | | |
|---|---|---|---|
| 2013/0003490 A1 | 1/2013 | Kemker et al. | |
| 2013/0227569 A1* | 8/2013 | Kohli | H04W 4/38 718/1 |
| 2019/0222652 A1* | 7/2019 | Graefe | H04L 67/12 |
| 2020/0097670 A1* | 3/2020 | Seshadri | H04L 63/20 |
| 2020/0118412 A1* | 4/2020 | Anderson | H04W 4/023 |
| 2020/0211358 A1* | 7/2020 | Burke | G08B 21/043 |

FOREIGN PATENT DOCUMENTS

DE 102010060650 A1 5/2011

OTHER PUBLICATIONS

Dickey et al., "Home automation using Cloud Network and mobile devices", Mar. 1, 2012, IEEE, 2012 Proceedings of IEEE Southeastcon (pp. 1-4) (Year: 2012).*

(Continued)

*Primary Examiner* — Davoud A Zand
(74) *Attorney, Agent, or Firm* — Laurence A. Greenberg; Werner H. Stemer; Ralph E. Locher

(57) ABSTRACT

A method includes wirelessly coupling a domestic appliance to a mobile device and allocating or assigning a sensor of the domestic appliance as a local apparatus of the mobile device for a function running on the mobile device. A household appliance, a mobile device and a system including a household appliance and a mobile device, are also provided.

13 Claims, 8 Drawing Sheets

(56) References Cited

OTHER PUBLICATIONS

Mohaiminul et al., "Design and Implementation of an IoT Based Home Automation", Feb. 7, 2020, IEEE, 2019 1st International Conference on Advances in Science, Engineering and Robotics Technology (ICASERT) (pp. 1-5) (Year: 2020).*

Rinaldi Stefano et al, "Integrating remote sensors in a smartphone: The project "sensors for Android in embedded systems"", 2016 IEEE Sensors Applications Symposium (SAS), IEEE,Apr. 20, 2016 (Apr. 20, 2016), pp. 1-6, XP032905752, Section II, Section IV, Section IV.A, Section V, Figures 2-4.

Jeonggil Ko et al, "Sensor Virtualization Module: Virtualizing IoT Devices on Mobile Smartphones for Effective Sensor Data Management", International Journal of Distributed Sensor Networks, Band 2015, Oct. 4, 2015 (Oct. 4, 2015), pp. 1-10, XP055736160, Section 2, Figure 3.

Shahzad Khurram et al, "A comparative study of in-sensor processing vs. raw data transmission using ZigBee, BLE and Wi-Fi for data intensive monitoring applications", 2014 11th International Symposium on Wireless Communications Systems (ISWCS), IEEE,Aug. 26, 2014 (Aug. 26, 2014), pp. 519-524, XP032666682, Section IV.A.

* cited by examiner

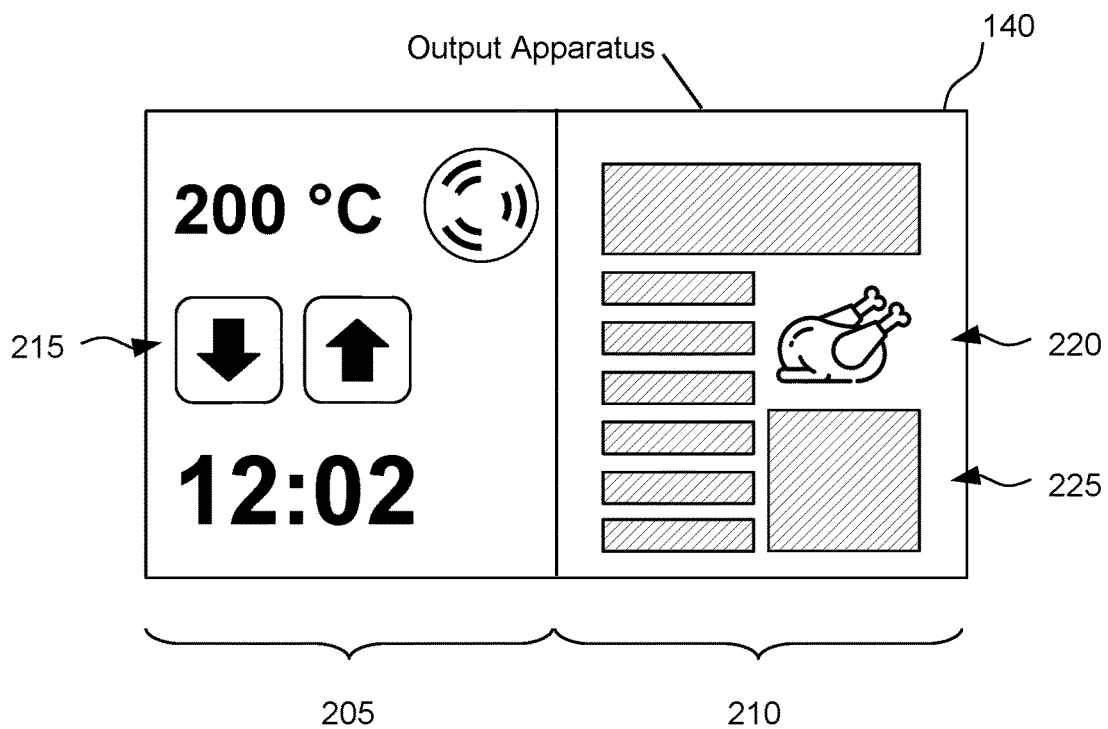
Fig. 2a
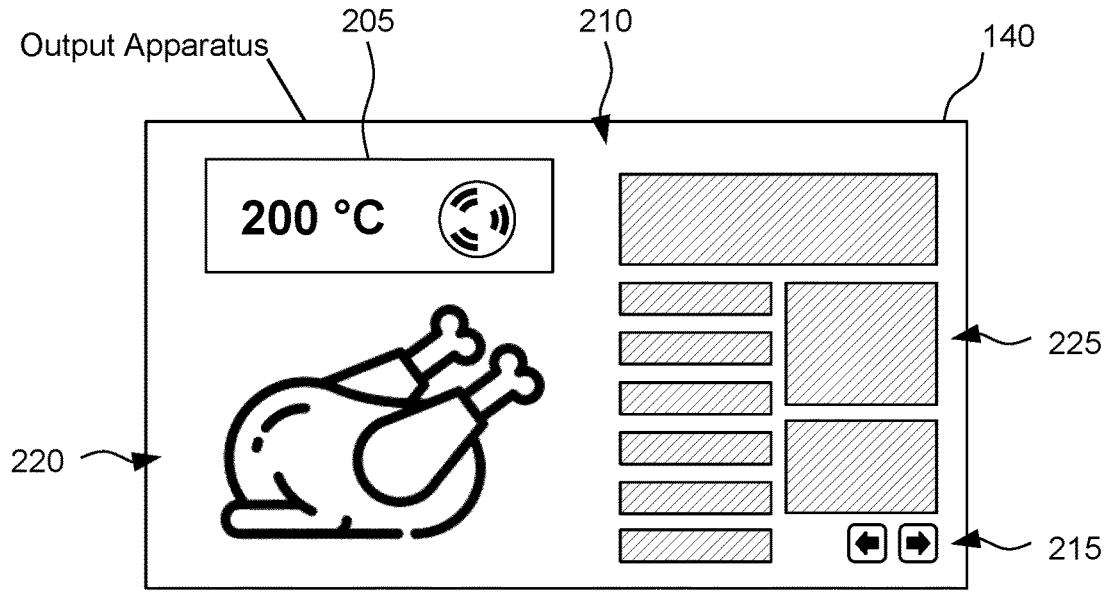
Fig. 2b
Fig. 2

COUPLING A DOMESTIC APPLIANCE TO A MOBILE DEVICE

FIELD AND BACKGROUND OF THE INVENTION

The invention relates to a household appliance. In particular, the invention relates to a wireless coupling of a household appliance to a mobile device.

A household appliance comprises a graphical display on which a state of the appliance can be displayed. For example, the display on a refrigeration appliance can show an internal temperature, a degree of filling, a currently consumed energy, or an operating mode. An operation of the household appliance is typically performed by means of an input apparatus that is mounted locally, for example a switch or knob. The input apparatus can be embodied integrated with the output apparatus, for example in the form of a touch-sensitive screen (touch screen).

The graphical display can be used in order to provide a user with an additional function that can go beyond controlling the household appliance. For example, a cooking recipe can be displayed on the display. However, it has been shown that providing the additional function, in the given example the provision of a collection of cooking recipes, can be costly to implement. The function usually needs to be updated on a functional level and on a data level on a regular basis. In this case, it is possible for a serviceable life of the household appliance to exceed many times over a serviceable life of a common platform that can classically provide the function. The household appliance is therefore no longer capable of reliably performing the additional function in its current form well before the end of the useful life of the appliance.

Equipping the household appliance with a powerful processing facility can be cost-intensive; moreover, it is usually not known what the specific requirements for providing the function will be in the future, with the result that the processing facility can still be undersized in a required aspect.

SUMMARY OF THE INVENTION

An object underlying the present invention is to provide an improved technology for coupling a household appliance to a mobile device. The invention can achieve this object, for example, by means of the subject matters of the independent claims. Subordinate claims can reflect preferred embodiments.

According to one aspect of the present invention, a first method comprises steps of wirelessly coupling a household appliance with a mobile device; and providing a sensor of the household appliance as a local appliance of the mobile device for a function that is running on the mobile device. The sensor can be designed as a sensor module and can be addressable as an input device and/or an output device. In particular, a behavior of the sensor can be configured by means of the output function. An output device, an input device, or a combination of an input device and an output device can also be provided to the mobile device as a local appliance.

For example, the sensor of the household appliance can be used by a function, for example an application ("app") that is running on the mobile device, essentially as if the mobile device comprised the sensor. For the function, the physical attachment location of the sensor can be irrelevant or indeterminable. By providing the sensor in this manner, the sensor can be put to further use. For this purpose, the sensor can be made available by an operating system of the mobile device, for example in the form of a readable and/or writable device file. In one embodiment, the household appliance can have no function that makes use of the sensor other than providing the sensor for the mobile device. The sensor, or a sensor value that can be ascertained by the sensor, is typically allocated to a function of the household appliance.

The function of the household appliance can involve a main function or an auxiliary function. For example, a main function of a dishwasher includes cleaning dishes; an auxiliary function could comprise scheduling a cleaning time or reordering detergent. The auxiliary function is not always required for the main function. If the auxiliary function cannot be provided, the main function can usually still be used. Often, the auxiliary function can be provided in a way other than by means of the household appliance. For example, in the above example, the procurement of detergent could also be performed by a person. The main function usually characterizes the household appliance; if the main function fails, the household appliance usually can no longer fulfill its purpose, an auxiliary function can no longer run or can become useless. For example, scheduling a cleaning time would be pointless if the cleaning function cannot be provided.

By means of the present invention, for example, a bar code reader that is attached to a refrigerator can be used by a function that is running on the mobile device, which manages a stock of food in a household.

The sensor can be configured so as to sample an area of the household appliance and to provide a sensor value; wherein the sensor value is transmitted to the mobile device and is provided to the function. The area can be in an environment of the household appliance, wherein if the sensor can comprise, for example, a camera or a radar or LiDAR sensor. The area can also be within the household appliance, wherein the sensor can comprise, for example, a switch or a temperature sensor. A function of the household appliance can be controlled on the basis of a sensor value that is provided by the sensor. The sensor can be coupled to the household appliance in a wired or wireless manner.

The sensor can be provided in dependence upon a predetermined guideline, which can also be called a policy. In particular, it can be specified which function is to have access to which household appliance or which sensor, under which user a function that is accessing the sensor is to run, or which type of access is to be granted to the sensor. The guideline can be a simple if-then statement, or a set of rules can be stored that determines an access right on the basis of one or more parameters.

The provision of the sensor to the function can be controllable by a user of the mobile device. In a first variant, the user can store a default setting for access rights; in a second variant, the user can interactively grant or deny access rights. For example, confirmation from the user can be obtained before the function accesses the sensor.

The guideline can also be obtained from a central point. The central point can manage the household appliance or several household appliances that are preferably included in a common household. Authorizations that control an interaction of household appliances with one another and with a mobile device can thus be stored at a central point. A consistency check or change of a guideline can thus be improved. If a new household appliance becomes available, its capabilities can be better adapted to match those of existing household appliances.

The method can further comprise controlling a sampling criterion or parameter of the sensor by the function. The control can require transmission of a parameter from the mobile device to the household appliance. The control can specify the manner in which the sensor is used or set a boundary condition on its use. The setting of such a parameter can be coordinated to predetermined conditions by the guideline. For example, if the sensor is a camera, the parameter can relate to, for example, a color, a brightness, a contrast, an orientation, a focal length, an illumination, a repetition rate, or a trigger time.

According to a further aspect of the present invention, a second method comprises steps of wirelessly coupling a household appliance to a mobile device; receiving a message by the mobile device; transmitting an indication of the received message from the mobile device to the household appliance; and providing the indication on the part of the household appliance to a user. This aspect is not necessarily dependent on the above-mentioned first aspect of the invention but can be implemented in conjunction therewith.

The message can be sent out proactively from an external point, even without having been explicitly requested by the mobile device ("push message"). Such a message can include, for example, an SMS, an e-mail, a WhatsApp message, or an RSS feed. The message itself can be held at the external point or forwarded to the mobile device. The indication can state, for example, the type of message, who the sender is, how many messages there are, or when a message was sent. The message itself is preferably initially not forwarded to the household appliance. Thus, a user who is, for example, engaged in a task for which they are using the household appliance or during which they are at least in its vicinity (e.g., cooking), can be promptly informed of the presence of a message. For example, while cooking, you can be briefly informed that your mother has sent you a WhatsApp message.

The transmission can be performed in dependence upon a predetermined guideline. The guideline can be similar to the one described above. For example, the guideline can specify which message is to be indicated to which user at which household appliance.

The message can also be provided at the household appliance. For this purpose, a user can control the download of the message in response to the indication, or the message can be transmitted to the household appliance along with the indication. For this purpose, the household appliance can, for example, be coupled to a voice interface, such as a smart speaker like an Amazon Alexa Echo. A content that is transmitted to the household appliance can be adapted in dependence upon a predetermined guideline. It is thus possible for example for a predetermined type of indication (for example, SMS or WhatsApp), a specific data format (for example, PDF or MP3), or a message from a predetermined sender to not be transmitted. The household appliance can thus be protected from executing a potentially dangerous content. Resources of the household appliance can be conserved. Information that cannot be displayed cannot be transmitted to the household appliance in the first place. A main function of the household appliance can remain accessible in an improved manner.

In one embodiment, the mobile device is automatically coupled to the household appliance if an indication is to be transmitted. The coupling can also be automatically disconnected again after the indication has been transmitted.

According to a further aspect of the present invention, a household appliance comprises a sensor; a communication facility for wireless communication; and a processing facility. In this case, the processing facility is configured so as to wirelessly couple the mobile device to the household appliance, and to provide a sensor value that is acquired by means of the sensor to the mobile device.

According to still another aspect of the present invention, a mobile device comprises a communication facility for wireless communication; and a processing facility. In this case, the processing facility is configured so as to wirelessly couple the mobile device with the household appliance having a sensor and to provide the sensor as a local appliance to a function that is running on the mobile device.

According to yet another aspect of the invention, a system comprises a household appliance that is described herein and a mobile device that is described herein. Features of the system can be transmitted to a household appliance and/or mobile device, or vice versa.

According to still another aspect of the present invention, a household appliance comprises a wireless communication facility; an output apparatus; an input apparatus; and a processing facility. In this case, the processing facility is configured so as to wirelessly couple a mobile device with the household appliance, provide an output of the mobile device by means of the output apparatus, and provide an input to the mobile device at the input apparatus.

It has been recognized that in order to perform an additional function that can be provided at the household appliance, a mobile device can represent a more suitable platform than a processing facility of the household appliance. The household appliance can be designed in a relatively simple manner as a "dumb terminal" that can only transmit output of the mobile device to a user, and input of the user to the mobile device.

The additional function can be improved on the mobile device, updated or synchronized with an external dataset. For this purpose, the mobile device can comprise, in particular, a smartphone. If a performance requirement of the function exceeds the performance capability of the mobile device, the mobile device can be updated relatively easily. The updated mobile device can be coupled to the household appliance in the same manner as the original. Thus, the household appliance can be used for a long time without having to accept significant limitations in the usability of the function.

The household appliance can support both directions of interaction with a user so that the mobile device does not need to be operated directly for the user to use the function. For example, the user can carry the mobile device or place it in a charging station and use the function on the household appliance. In this case, the function can be related to the use of the household appliance, for example, in that the household appliance can be used to prepare a meal and the function comprises the presentation of a cooking recipe. The relationship can also be indirect, such as where the function comprises a calendar and the completion of a dish is to be coordinated with a date in the calendar. In still another embodiment, there is no classical functional connection, for example, if the household appliance comprises a refrigerator and the function involves playing music. Nevertheless, a user can use both functionalities at the same time and place.

In one embodiment, the household appliance does not specify the type of additional function, so that practically any function of the mobile device can be used by means of the household appliance. For example, a first function of the mobile device can be interrupted or replaced by a second function on an event-driven basis, such as when the playing of music is interrupted because a telephone call is to be answered.

The input apparatus of the household appliance is typically configured for direct actuation by the user and can comprise, for example, a button, a switch, a rotary knob, or a touch screen. In a further embodiment, the input apparatus can also be arranged for indirect actuation and can comprise, for example, a bar code reader to which the user can present a bar code, such as from a food package, with the result that the bar code reader provides an input in dependence upon the registered bar code. Further exemplary input apparatuses that can be used in conjunction with the technology that is disclosed herein include a gesture recognition device, an olfactory sensor (VOC: volatile organic compound), or an accelerometer.

The output apparatus preferably comprises an optical output region that can provide textual, numeric, alphanumeric or graphical outputs. For this purpose, the output apparatus can in particular comprise a display or a projector. However, the output apparatus can also support other output to the user, for example an acoustic or haptic output.

The output apparatus can comprise an optical display having at least two display regions. In this case, the processing facility can be configured so as to display information of the household appliance on a first display region and to display the output of the mobile device on a second display region.

By dividing the output apparatus into regions, a function of the household appliance and a function of the mobile device can be made accessible to a user in parallel. In particular, the information can relate to an operating parameter or a working state of the household appliance, so that the household appliance can remain controllable independent of a function of the mobile device. In a first variant, the display regions can be adjacent to one another, and in a second variant, one of the display regions can overlay another. If more than one function of the mobile device is to be supported on the household appliance, a corresponding number of display regions can be formed on the output apparatus for this purpose. It is preferred that the display region for the function of the household appliance is always visible, while a display region for a function of the mobile device on the output apparatus can also be reduced in size, concealed or hidden. For example, three display regions can be formed, one of which can be allocated information of the household appliance and another of which can be allocated to a function of the mobile device. The third display region can be allocated to one or more functions of the mobile device, wherein the allocation of a function to the display region can be event-based or controlled by the user.

The input apparatus can comprise a first operating element and a second operating element, wherein the processing facility is configured so as to control a function of the household appliance in dependence upon an actuation of the first operating element and to provide an actuation of the second operating element to the mobile device. Direct controllability of the household appliance can thus be ensured independent of the controller of a function of the mobile device. In particular, if the household appliance can perform a potentially hazardous operation, such as heating, kneading, or chopping, use of the function of the mobile device cannot compromise a safety of operation or use of the household appliance.

The processing facility can further be configured so as to establish two wireless data connections that are independent of one another, one that is allocated to an output of the mobile device and the other is allocated to an input to the mobile device. The data connections can use different standards so that use of a known mobile device can be facilitated. For example, an output of the mobile device can be transmitted by means of Miracast, Airplay, Google Cast, Screen Mirroring, VLC, or Wireless Display (WiDi), while an input to the mobile device can be transmitted, for example, by coupling the household appliance to the mobile device as a Bluetooth input apparatus. Different technologies can also be used for the different data connections, for example WLAN, Bluetooth, ZigBee or infrared transmission. In a particularly preferred embodiment, one of the data connections uses the Home Connect protocol, which can also be used to network multiple household appliances together.

The processing facility can be configured so as to only then couple to the mobile device if a distance of the mobile device to the household appliance falls below a first predetermined threshold value. The coupling can be performed automatically if a user who is carrying the mobile device approaches the household appliance. It is possible to not require user intervention, for example in order to confirm or allow the coupling procedure. In a further embodiment, confirmation can be required only on the part of the household appliance. In still another embodiment, confirmation can be required, but can apply for a predetermined time during which re-confirmation is then not required for re-coupling. Due to the automatic coupling, the interface of the function of the mobile device can follow the user if the user is moving in a household having multiple household appliances that offer coupling as described herein.

The processing facility can be configured so as to terminate an existing coupling with a mobile device if a distance of the mobile device to the household appliance exceeds a second predetermined threshold value that is greater than the first threshold value. The coupling can be distance-controlled with a predetermined hysteresis. It can consequently be ensured that coupling and termination of the coupling are not performed in rapid succession if the mobile device is at a distance close to the first threshold value from the household appliance.

It is to be noted that in one embodiment, a coupling that is described herein can comprise the establishment of a data connection, for example in the ISO/OSI model at one or more of layers 1 to 7, while in another embodiment, a coupling relates to only the display of the output or the transmission of the input that in each case require a data connection that is established. In other words, a data connection that is established between the household appliance and the mobile device can be maintained even if the mobile device is moved further away from the household appliance than is specified by the second threshold value, however in this case it is possible to suppress output of the mobile device or to not forward input to the mobile device.

The processing facility can moreover be configured so as to wirelessly couple a further mobile device with the household appliance, to provide an output of the further mobile device by means of the output apparatus, and to provide an input to the further mobile device at the input apparatus. Thus, multiple mobile devices, which can in particular be allocated to different users, can be simultaneously coupled with the household appliance. The household appliance can support simultaneous use of functions of both mobile devices.

In particular, the processing facility can be configured so as to allocate outputs of the mobile devices to the output apparatus and/or so as to allocate inputs to the mobile device. The allocation can be on the basis of rules. A rule can take into account an event, for example a current distance of a mobile device from the household appliance. The allocation or a rule can be controlled by a user. Different users can set different rules. In one embodiment, multiple functions of different mobile devices can be controlled simultaneously via the household appliance. In another embodiment, only one function can be controlled in each case, wherein this function can be selected from several possible functions of the mobile devices. It is preferred that the mobile devices are separated from one another in terms of data technology, so that influence from one mobile device on another of the mobile devices cannot be exerted by the household appliance.

According to a further aspect of the present invention, a system comprises multiple household appliances that are described herein, wherein processing facilities of the household appliances are configured in each case so as to determine a distance of the allocated household appliance to the mobile device, wherein only an input from the closest household appliance is provided to the mobile device. As a consequence, a user can carry a mobile device and control a function that is running thereon from the respective household appliance that is closest to the user. A user interface for the function can follow the user from device to device in the household. If the household appliances support coupling with multiple mobile devices, multiple users can thus be mobile in the home simultaneously and can conveniently and elegantly control functions, which are allocated respectively to the users, via the household appliances.

In order to determine which household appliance is closest to a mobile device, the household appliances can be connected to one another in terms of data technology. A wireless or a wired variant can be used for this purpose. The household appliances can also be connected to one another via a central component, such as a router or a server. In particular, the household appliances can be connected to one another by means of Home Connect. In one embodiment, the household appliances in each case can exchange determined distances to a mobile device with one another. One household appliance can communicate to another when it would like to control a function of the mobile device or relinquish control.

According to still another aspect of the invention, a further system comprises multiple household appliances that are described herein, wherein processing facilities of the household appliances are in each case configured so as to provide an output of the mobile device by means of an allocated output apparatus. For example, the output can be provided on all of the household appliances of a household or a room of the household. In one embodiment, an output is provided on all household appliances the distance of which from the mobile device is below a predetermined threshold value.

According to yet another aspect of the present invention, a third method for controlling a household appliance comprises steps of establishing a wireless coupling of the household appliance to a mobile device; registering an input at an input apparatus of the household appliance and providing the input to the mobile device; and registering an output of the mobile device and providing the output by means of an output apparatus of the household appliance.

An establishment and/or termination of wireless coupling and transmission of inputs and/or outputs between the household appliance and the mobile device can be dependent on other factors, as are for example described herein in relation to a household appliance and a system having at least one household appliance.

According to still another aspect of the invention, a household appliance comprises a communication facility for wireless communication; an output apparatus; and a processing facility. In this case, the processing facility is configured so as to wirelessly couple a mobile device with the household appliance and provide an output of the mobile device on the basis of a predetermined set of rules on the output apparatus.

On the basis of the set of rules, it is possible to determine which output should appear on the output apparatus and which should not. For example, misuse of the household appliance by an unauthorized mobile device can thus be prevented. Moreover, overfilling of the output apparatus by contents that are received can be prevented. For example, a predetermined portion of the output apparatus can be reserved for displaying a parameter that is allocated to a controller of a function of the household appliance. If the output apparatus is a touch-sensitive screen (touch screen), operability of the function can be simultaneously ensured. The household appliance can remain controllable independent of the provision of a received output by a user. In a further embodiment, the controllability can be used in order to change the set of rules so that a content that is provided on the output apparatus can always remain controllable by a user.

The processing facility is preferably configured so as to download or update the set of rules from an external point. The external point can in particular comprise a central server or a service, which for example can be realized in a cloud. The external point can be authenticated by means of cryptographic methods so that downloading of a compromised set of rules can be prevented. The processing facility can be configured so as to couple a further mobile device, wherein a priority of outputs of the mobile devices can be determined on the basis of the set of rules. In principle, any number of mobile devices can be coupled with the household appliance. A space that is available for displaying contents on an optical output apparatus is limited with the result that by prioritizing outputs it is possible to ensure that one or more of the outputs are displayed appropriately large, while others can be displayed possibly only in part or not at all.

In one embodiment, an output of a mobile device is provided if a higher prioritized output is not available for provisioning. In other words, only an output with the highest priority can be provided at any time. Lower prioritized outputs cannot be displayed until they are themselves highly prioritized. For example, an output can be removed from the output apparatus by confirmation from a user.

In still another embodiment, an output of a mobile device of a lower prioritized output is overlaid by a higher prioritized output. In particular, the overlay can be graphical. The higher prioritized output can be provided, for example, in the form of a superimposed window, a modal dialog, or a message in the foreground.

The set of rules can be defined on the basis of predetermined statements, wherein each statement can be predetermined in the form of a list. For example, the set of rules can comprise a first statement of mobile devices the outputs of which cannot be provided on the output apparatus. The first statement can also be called a negative list or blacklist. An identification of the mobile device is typically determined when coupling is established with the household appliance and can be repeated as information is transmitted. By means of the first statement, for example, a mobile device that is classified as malicious can be excluded from the output apparatus.

The set of rules can include a second statement of mobile devices the outputs of which can be provided on the output apparatus. In the form of a list, the second statement can also be referred to as a positive list or whitelist.

The set of rules can comprise a third statement of functions of a mobile device the outputs of which are allowed to be provided on the output apparatus. In other words, the third statement can comprise a positive list for functions. A function of a mobile device can be provided by a program or application ("app"). Similarly, it is possible to provide a negative list for functions of a mobile device.

The set of rules can comprise a fourth statement of content that is allowed to be provided on the output apparatus. Permitted content can, for example, relate to text or graphics. In this case, for example, a size, a resolution, a color depth, or a content that can be provided in each case on the output apparatus can be determined. In the form of a list, the fourth statement can concern a positive list of content. Accordingly, a negative list of content that cannot be provided on the output apparatus can also be provided.

It is to be noted that different statements or lists can be included in the set of rules. In this case, the statements can be considered in a predetermined order. In particular, it is possible to go through the statements in the manner of a firewall for a computer network, wherein a statement that is applicable to a received output can optionally be applied immediately without checking further statements. A suitable positive statement can result in immediate provision of the output to the output apparatus, while an applicable negative statement can lead to the immediate rejection of the output.

In a corresponding manner to how an output of the mobile device is transmitted to the household appliance and provided at the household appliance, an input at the household appliance can be transmitted to the mobile device and processed at the mobile device. In one embodiment, an input that is registered at the household appliance can also be subject to verification by the set of rules.

The household appliance can comprise an input apparatus, wherein the processing facility is configured so as to provide an input at the input apparatus to the mobile device on the basis of the set of rules. In one embodiment, different sets of rules are allocated to an input and an output; in another embodiment, only one set of rules is defined for inputs and outputs. A rejected input or output can be discarded, or the transmission of information with the relevant function or mobile device can be aborted.

The household appliance can further comprise a storage apparatus for recording an input if the wireless connection or coupling is temporarily interrupted. For example, the connection can be interrupted or disrupted if a person who is carrying the mobile device moves within the range of the household appliance. The temporary interruption can be transparent for the household appliance and the mobile device or functions that are respectively running thereon. The wireless connection can only then be terminated if it is interrupted or disrupted for more than a predetermined period. Then, for example, the household appliance can release a space on the output apparatus that is occupied by an output of the mobile device.

According to yet another aspect of the present invention, a system comprises a household appliance that is described herein and a mobile device that are wirelessly coupled to one another. An input at the household appliance can be transmitted via the coupling to the mobile device and processed on the mobile device. Moreover, an output of the mobile device can be transmitted to the household appliance, where the output can be provided to a user. The household appliance can be designed in a relatively simple manner as an "unintelligent terminal" (dumb terminal) that can only provide output of the mobile device to a user and input of the user to the mobile device. Since the execution of the function is performed on the part of the mobile device, the household appliance can already get by with a small processing capacity.

In one embodiment, a first component is executed on the mobile device so as to generate the output, and a second component is executed on the household appliance so as to provide the output to the output apparatus. In this case, the household appliance and the mobile device are configured so as to restore a temporarily interrupted wireless coupling without influencing a function of the first component or the second component. In other words, the mobile device and the household appliance can transparently maintain a wireless connection even in the presence of temporary disruptions without requiring a reading or writing component on the part of the household appliance or on the part of the mobile device to be informed of only a short-term interruption or disruption.

According to still another aspect of the present invention, a fourth method for providing an output of a mobile device on an output apparatus of a household appliance that is wirelessly coupled to the mobile device comprises steps of receiving an output of the mobile device; checking, with reference to a predetermined set of rules, whether the output can be provided on the output apparatus; and providing the output in dependence upon a check result.

According to yet another aspect of the present invention, a fifth method for providing an input at an input apparatus of a household appliance that is wirelessly coupled to a mobile device to the mobile device comprises steps of registering an input at the input apparatus; checking, with reference to a predetermined set of rules, whether the input is allowed to be provided to the mobile device; and providing the input to the mobile device in dependence upon a check result. The fourth and/or fifth methods can be performed in each case on a household appliance.

According to another aspect of the present invention, a household appliance comprises a communication facility for wireless communication; an output apparatus; a facility for determining a distance to a mobile device; a processing facility that is configured so as to wirelessly couple the mobile device with the household appliance and to provide an output of the mobile device in dependence upon the determined distance on the output apparatus.

A user can carry the mobile device and move freely within the region of the household appliance. An output of the mobile device at the household appliance can be provided in such a manner that a perception of the output is adapted to the distance of the user from the household appliance. The user can better register the output and, if necessary, can respond better thereto. For example, if the output comprises information that relates to a function of the household appliance, the user can thus better control the function.

The facility for determining the distance can comprise a dedicated sensor such as an ultrasonic sensor, a radar sensor, or a LiDAR sensor. In a preferred embodiment, the facility for determining the distance is designed in an integrated manner with the communication facility. For example, a distance between the mobile device and the household appliance can be determined on the basis of information that a common communication facility already determines. For example, in the case of communication by means of WLAN or Bluetooth, such information can be incurred or determined specifically.

The communication facility can be configured so as to determine the distance on the basis of a strength or a freedom from interference of a wireless signal that is received by the mobile device. The strength of the received signal is also called RSS ("received signal strength") and can allow determination of the distance knowing the strength of the transmitted signal. A freedom from interference can be stated as a signal to noise ratio (SNR). An error rate in the transmission of information between the household appliance and the mobile device can also be taken into consideration so as to determine the freedom from interference.

In one embodiment, a distance between the devices is determined by means of a technology that is known as beacon. In this case, one of the devices transmits wireless signals that include a message. The message can include information in relation to the strength of the transmitted signal, a position of the transmitter, an identification of the transmitter, or further statements. As a consequence, it is possible to determine the distance in a range that can include up to approximately 20 meters. The shorter the distance, the more accurate the determination can be. A receiver can better determine its position in relation to a distance to a beacon. An accuracy of the determined position can be below approximately one meter.

The output apparatus can comprise a display facility, wherein a size, a level of detail or a color selection of the output is controlled in dependence upon the distance. In this case, the output that is provided can be adapted to capabilities of the display facility, for example in relation to a display size, an orientation, or arrangement of individual items of information. If a display facility is too small to fully display predetermined information in a desired size, the information can be provided in a ticker style or in a predetermined sequence one after another.

The output apparatus can include a controllable sound source, wherein a volume of the output is controlled in dependence upon the distance. For example, an audio stream can thus be output in such a manner that it is always perceived by the user to be the same volume, even if the user changes position in a room having the household appliance.

According to still another aspect of the present invention, a mobile device comprises a communication facility for wirelessly coupling to a household appliance, wherein the mobile device is configured so as to transmit an output that is to be provided to the household appliance.

In particular, the mobile device can be configured so as to couple to a household appliance according to a predetermined guideline. For example, the guideline can control which function or application, which is executed by the mobile device, is to be allocated to a predetermined household appliance or function that is executed by the household appliance. Communication between predetermined communication partners on the part of the household appliance and the mobile device can thus be more easily established. For example, a function that is allocated to a household appliance can be automatically started on the mobile device if the household appliance comes within a predetermined distance.

The guideline can further control which household appliance the mobile device couples to. In particular, the guideline can control the mobile device to couple only to a predetermined one of a plurality of household appliances. For example, coupling can only occur with one closest household appliance at a time, in other words a household appliance that is the shortest distance from the mobile device. This determination can be performed on a predetermined group of household appliances that are allocated for example to a predetermined household.

The mobile device can be configured so as to obtain the guideline from a central point. This can make use of a wired or wireless communication facility. The central point can control or manage aspects of household appliances that are allocated to a user or household.

The mobile device can be configured so as to receive wireless signals from the household appliance, to determine an indication of the distance of the mobile device to the household appliance on the basis of signals that are received; and to transmit the distance to the household appliance. It is possible due to determining the distance on the part of the mobile device to easily use technology that is available on the mobile device. In particular, the household appliance or control apparatus can be designed as a beacon to which the mobile device can easily determine its distance.

According to yet another aspect of the present invention, a system comprises a household appliance that is described herein a mobile device that is described herein. If the mobile device is configured so as to apply a guideline, the system can further comprise a central point for providing a guideline for the mobile device.

It is preferred that the mobile device is configured so as to determine and communicate its position to the household appliance on the basis of the received wireless signals; and the household appliance is configured so as to determine the distance on the basis of its position and the position of the mobile device. The mobile device can determine its position on the basis of one or more sensors, for example by means of a satellite-based radionavigation system or an inertial platform. The position can alternatively or additionally be determined by determining a distance to one or more beacons, one of which can include the household appliance.

According to still another aspect of the present invention, a sixth method comprises steps of determining a distance between a household appliance and a mobile device; wirelessly coupling the household appliance with the mobile device; transmitting an output of the mobile device to the household appliance; and providing the output to the household appliance in dependence upon the determined distance.

The distance can be determined on the basis of a wireless communication signal that is transmitted between the household appliance and the mobile device. In particular, the communication signal can comprise WLAN or Bluetooth (BT or BTLE). Information that is transmitted by means of the communication signal can support the determination of the distance.

Methods that are described herein can generally be combined or integrated with one another. In this case, a part of one method can be merged with a part of another method to form one method. A combination of several methods, in whole or in part, is also possible. A method in accordance with the invention can be in the form of a computer program product having program code means and can be executed by means of a processing facility, which in particular comprises a programmable microcomputer or microcontroller or is designed as such. In particular, the processing facility can be included in a household appliance that is described herein or a mobile device that is described herein. In some cases, distributed processing of the method is possible on different processing facilities, which can be arranged in different devices, in particular in a household appliance and a mobile device.

Household appliances or systems that are described herein can likewise be combined or integrated with one another. Methods, apparatuses, household appliances, mobile devices, or systems that are described herein can implement the present invention in various ways or in various aspects.

Advantages or features can be transferred between the subject matters or combined with one another.

The invention has been explained with reference to several claim categories (method, apparatus, household appliance, mobile device, system, computer program product, etc.). Unless stated otherwise, all the features of one claim category can be applied in a similar manner to all other claim categories. In particular, the apparatuses have corresponding means in order to implement the method steps that are described. Even within a claim category, the features can be freely combined with one another in order to provide further embodiments that are not explicitly described herein.

Advantageous embodiments of the invention are now described in more detail with reference to the accompanying figures.

BRIEF DESCRIPTION OF THE FIGURES

FIG. 2 including FIGS. 2A and 2B shows an exemplary representation of an output on a household appliance;

DETAILED DESCRIPTION OF THE INVENTION

Figure 1:
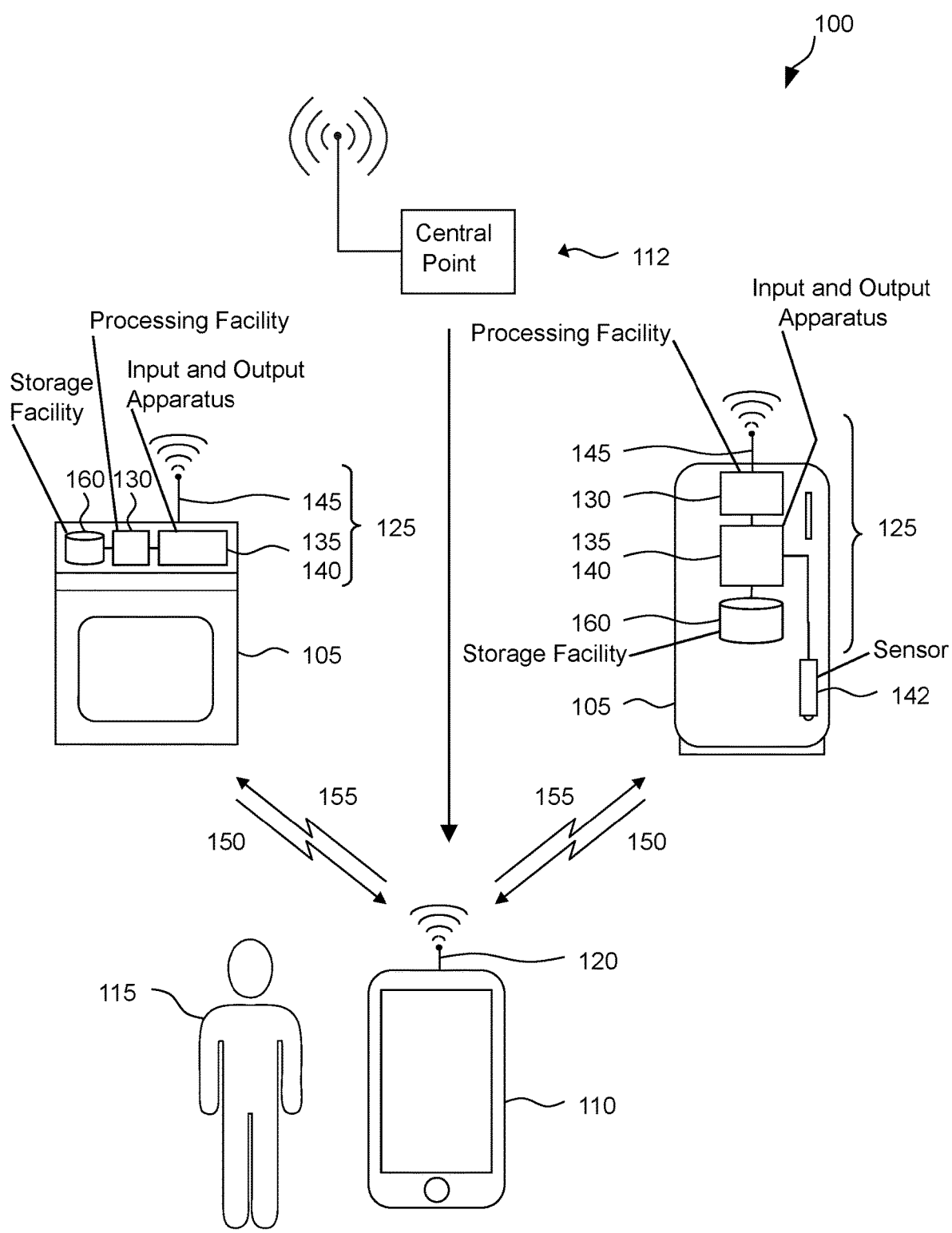
FIG. 1 shows a system having a household appliance and a mobile device.

FIG. 1 illustrates a system 100 having at least one household appliance 105, a mobile device 110, and an optional central point 112. A first exemplary household appliance 105 is illustrated by way of example as an oven, a second is illustrated as a refrigerator; however, other appliances can also be used, for example a stove, an extractor hood, or a stirring device. In particular, the household appliance 105 can comprise a kitchen appliance that is configured so as to operate in a kitchen of a household. The household appliances 105 are preferably located close to one another, for example in a common household or a common room such as a kitchen.

The mobile device 110 preferably comprises a smartphone, a tablet computer, or a fitness watch, and is usually allocated to a predetermined user 115 who can carry the mobile device 110. The mobile device can also comprise a smart speaker, for example an Amazon Echo Dot or Show type device. A predetermined function can be provided on the mobile device 110, which can be provided in particular by an allocated program or application. Exemplary functions include managing a collection of cooking recipes, an acoustic or text communication with another remote user, or an output of music. For this purpose, the function can provide an output to the user 115 by means of a local output apparatus on the mobile device 110, in particular in visual, acoustic, or haptic form. Moreover, the function can evaluate an input of the user 115 at a local input apparatus of the mobile device 110, for example an input that is provided manually by the user. Appropriate input and/or output apparatuses can be provided on the mobile device 110 for this purpose. The mobile device 110 can also be configured so as to evaluate further inputs or environmental parameters that can be indirectly controlled by the user 115, such as a position, an acceleration, or an ambient brightness.

The mobile device 110 is typically configured so as to be connected to a wireless network, in particular a wide area network such as the internet. Via this connection, the mobile device 110 can also communicate with the central point 112. For this purpose, the mobile device 110 can use, for example, WLAN or mobile communications, for example 4G or 5G. Moreover, the mobile device 110 preferably comprises a wireless communication facility 120 that is configured so as to establish a wireless data connection to a local appliance, for example to the household appliance 105.

The household appliance 105 comprises a control apparatus 125, which is preferably configured so as to control a function of the household appliance 105. In one embodiment, the control apparatus 125 is configured so as to control multiple household appliances 105. A control apparatus 125 can also be stand-alone and not implemented as part of a household appliance 105. In this case, a communication between the control apparatus 125 and an allocated household appliance 105 is preferably wireless, for example by means of a technology that is known as Home Connect. Multiple control apparatuses 125 can also be provided in a household and in each case the control apparatuses are configured so as to control at least one household appliance 105. In this case, the control apparatuses 125 can likewise be connected to one another by data technology.

The control apparatus 125 comprises a processing facility 130, an input apparatus 135, an output apparatus 140, and a wireless communication facility 145. In the present example, the input apparatus 135 and the output apparatus 140 are designed to be integrated with one another as a touch-sensitive screen. An input of the user 115 can be provided by touching a region of the input apparatus 135, wherein a visual indication of the input can be displayed in the region on the output apparatus 140. Thus, different inputs can be provided in a context-sensitive manner.

In a further embodiment, control apparatus 125 comprises a sensor 142 that is usually configured so as to sample the household appliance 105 or its environment. Exemplary sensors 135 comprise a temperature sensor, a humidity sensor, a switch, a current or voltage sensor, a brightness sensor, a camera, or a bar code reader. A sensor value that is acquired by means of the sensor 142 can be used so as to control the household appliance 105. For example, the sensor value can comprise an operating state, an internal state, an internal or external parameter, or an input value for the household appliance 105. The sensor 142 can be designed as a sensor module that can render it possible to control a sampling operation. For example, a measurement frequency or a measurement accuracy can be adjustable, or a measurement can be taken under a predetermined condition that is determined at the sensor module. The sensor module can provide a sampled value unprocessed ("raw") or processed ("cooked"). Appropriate processing can comprise, for example, averaging over time, a linearization of a characteristic curve, or mapping of multiple parameters to one.

It is proposed to perform a wireless coupling of the mobile device 110 to the household appliance 105. Then, an input of the user 115 on the input apparatus 135 of the household appliance 105 can be transmitted to the mobile device 110, where the input can be used to control the function. In a corresponding manner, an output of a function that is running on the mobile device 110 can be transmitted to the household appliance 105, where the output can be provided to the user 115 by means of the output apparatus 140. The input apparatus 135 or the sensor 142 or a corresponding sensor module can be provided as a local input apparatus for the mobile device 110. The output apparatus 140 can be provided as a local output apparatus for the mobile device 110. Multiple simple or combined facilities 135, 140, 142 of the household appliance 105 can also be provided as a combined input/output device at the mobile device 110.

In one embodiment, inputs and outputs can be transmitted via a single data connection. In another embodiment, a first data connection 150 can be configured so as to transmit the input and a second data connection 155 can be configured so as to transmit the output. In this case, the data connections 150, 155 can be independent of one another and use different protocols or technologies or can be implemented as only one bidirectional connection.

Via the first data connection 150, the control apparatus 125 can present itself as a user interface (UI) that is configured so as to register and provide inputs of the user 115. For example, WLAN or Bluetooth can be used as the underlying protocol for the data connection 150.

Via the second data connection 155, the control apparatus 125 can present itself to the mobile device 110 as a UI streaming server, in other words as a device that accepts a stream of output data that can be directed to a user 115. For example, Miracast or AirPlay can be used as the underlying protocol, which can in turn rely on WLAN or Bluetooth.

A distance between the household appliance 105 and the mobile device 110 can be determined on the basis of one of the data connections 150, 155. In particular, the communication facility 145 can be configured so as to estimate the distance and optionally also a direction of the mobile device 110 on the basis of transmission parameters. In particular, a signal strength, a signal-to-noise ratio, or an error rate can be used to determine the distance. If multiple antennas are available, corresponding parameters can be contextualized for distance determination. The distance can be determined on the part of the control apparatus 120 or on the part of the mobile device 110. A distance that is determined on the part of the mobile device 110 can be transmitted to the household appliance 105.

The mobile device 110 can also determine its geographic position, for example, on the basis of determinations of a receiver of a satellite-based navigation system, an inertial system, and/or a distance to one of the household appliances 105. For this purpose, a household appliance 105 can implement a beacon that provides its own position by means of wireless signals. In particular, this technology can be easily used on the basis of Bluetooth Low Energy (BTLE). The position of the mobile device 110 can then be determined on the basis of the position that is transmitted and a distance to the household appliance 105, which can be determined on the basis of transmission parameters of the wireless signal. The determined position of the mobile device 110 can be transmitted to the household appliance 115, which can then determine the distance to the mobile device 110 on the basis of the position of the household appliance.

Preferably, the processing facility 130 is configured so as to adapt properties of the output apparatus 140 and requirements of a received output of the mobile device 110 to one another. For example, an orientation (portrait or landscape), a color capability, a graphical resolution, or a size of an available display region of the output apparatus 140 can be provided as a property to the mobile device 110. If the mobile device 110 provides an output that does not follow these specifications, the processing facility 130 can convert the output accordingly. In this case, for example display sizes or resolutions can be converted into one another, or a color palette can be reduced or allocated differently.

In some embodiments, a display region on the output apparatus 140 can be provided dynamically for a function of the mobile device 110. In this case, the conversion can be transparent or changed properties of the output apparatus 140 can be reported to the mobile device 110.

In one embodiment, a storage facility 160 is provided that is connected to the processing facility 130 of the control apparatus 125. The storage facility 160 is preferably configured so as to operate as a temporary storage (cache) and to temporarily record information that cannot be transmitted to the mobile device 110 due to a failure in the data connection 150. In particular, an input that is registered at the input apparatus 135 can be temporarily stored, if necessary, until the data connection 150 is re-established. A corresponding storage facility can be provided on the part of the mobile device 110 in order to temporarily store an output that cannot be transmitted to the household appliance 105 due to an interrupted data connection 155. A corresponding temporary storage apparatus can be provided on the part of the mobile device 110 to temporarily store an output that can be undeliverable until the data connection 155 is re-established.

It is preferred that the household appliance 105 comprises a first software component and the mobile device 110 comprises a second software component and the software components exchange inputs and/or outputs with one another. In this case, the components can in each case build upon an underlying functionality of the household appliance 105 and the mobile device 110 respectively that provide transmission via the data connections 150, 155. If one of the data connections 150, 155 is temporarily disconnected, for example because the devices 105, 110 are outside a maximum bridgeable range, because antennas are unfavorably oriented with respect to one another, or because an object, such as a person 115, is located in a Fresnel zone of the antennas, information that is to be transmitted on the part of the household appliance 105 can be stored in the storage facility 160 and/or on the part of the mobile device 110 in a corresponding storage facility. If the data connection 150, 155 become available again within a predetermined time, for example, approximately 10 seconds, approximately 5 seconds, or approximately 2 seconds, the stored contents can be transmitted and the storage facilities can be emptied. The software components need not be notified of the interrupted or disrupted data connection 150, 155. For example, a continuous output of acoustic information that is provided on the part of the mobile device can be ensured on the part of the household appliance 105. If a data connection 150, 155 is interrupted or disrupted for longer than the predetermined time, both data connections 150, 155 or only the affected data connection 150, 155 can be terminated. Re-establishing a data connection 150, 155 can require a new authentication of one of the devices 105, 110.

It is preferred that, an output on the output apparatus 140 of the household appliance 105 is performed in dependence upon a determined distance to the mobile device. For example, an acoustic data stream can be output at an increased volume if the user 115 moves away from the outputting household appliance 105 with the mobile device 110. A visual display can increase in size as the distance increases.

The central point 112 is preferably configured so as to provide a guideline to a household appliance 105 that can control two functions. A first possible function is in an allocation of a household appliance 105 or a function that is running thereon to a function that is running on the mobile device 110. In other words, an allocated application ("app") can be launched on the mobile device 110 as soon as communication with a predetermined household appliance 105 has occurred. Which application this is can be determined on the basis of the guideline as well as a boundary condition, if applicable. For example, the boundary condition can relate to a functional state or capability of the household appliance 105. A personal preference of the user 115 of the mobile device 110 can also be considered. The guideline can be updated as needed by the central point 112, for example because a new household appliance 105 has been added in the same household, because a new user 115 has joined the household, or because the control apparatus 125 has been updated. For example, the control apparatus 125 can be replaced or updated via software update.

A second possible function of the guideline is to select which of multiple household appliances 105 the mobile device 110 couples to. For example, it is thus possible to specify that a first application is only to communicate with the household appliance 105 that is at the shortest distance from the mobile device 110. A second application can be limited to communicating with household appliances 110 that include an acoustic output apparatus 140. Other specifications or combinations are likewise possible.

The guideline can also determine which output has priority over which other output. For example, if multiple functions are active in a coupled mobile device 110, it can be predetermined which output has priority over which other output. Individual messages or information can also be prioritized differently. For example, a notification of the end of a cooking time can have priority over an output of a video stream. Such a distinction can also be made if multiple mobile devices 110 are coupled to or can communicate with a household appliance 105. In a continuation, priorities can also be considered between individual mobile devices 110 or users 115 that are allocated in each case to the mobile devices.

FIG. 2 illustrates an exemplary illustration of an output at an output apparatus 140 of a control apparatus 125 for a household appliance 105. In this case, a first display region 205 and a second display region 210 are respectively illustrated, wherein the first display region 205 is allocated to a controller of the household appliance 105 and the second display region 210 is allocated to the controller of an exemplary function of a coupled mobile device 110. The function is assumed to be a purely exemplary representation of a cooking recipe. The exemplary household appliance 105 is also assumed to be an oven. In further embodiments, more than two display regions 205, 210 can be supported.

FIG. 2a illustrates a first embodiment in which the display regions 205 and 210 are arranged adjacent to one another on the output apparatus 140. In the first display region 205, a temperature (200° C.), a symbol for an operating mode (circulating air) and a current time (12:02) are displayed as examples. Moreover, operating elements 215 are illustrated with which it is possible to adjust the temperature up or down in the present state. In the second display region 210, a graphical representation 220 of a food that is to be prepared by means of the cooking recipe and multiple text regions 225 are illustrated, which can comprise instructions or a list of ingredients.

FIG. 2b illustrates a second embodiment in which the second display region 210 initially occupies the entire area of the output apparatus 140, but is partially overlaid by the first display region 205. As a consequence, different space conditions are provided that can be dynamically utilized. In the present case, the outputs of the function are enlarged and arranged differently with respect to the embodiment of FIG. 2a. Additional space can be utilized by further text regions 225 or an additional operating element 215 for the function, for example for scrolling to the right-hand side or left-hand side. Outputs of the controller of the household appliance 105 are reduced and reduced in size with respect to the embodiment of FIG. 2a. The operating elements 215 and the time are no longer available here, and the temperature and the operating mode are shown smaller.

In a further embodiment, multiple mobile devices 110— or users 115 that are allocated in each case to the mobile devices—can be allocated in each case to a display region 205, 210. In one embodiment, display regions 205, 210 can be displayed in the manner of index card tabs. In this case, only one of the display regions 205, 210 can be displayed at a time, and the existence of further display regions 205, 210 can be apparent on index card tabs that are displayed. In order to display one of the further display regions 205, 210, the corresponding index card tab can be selected so that the content that is allocated thereto is displayed on the output apparatus 140.

Under what circumstances an output of a function occurs on a display region 205, 210 on the output apparatus 140, how large or positioned a display region 205, 210 is, or how multiple display regions 205, 210 are arranged on the output apparatus 140 can be determined by means of rules, which can also be called policies.

For example, priorities can be formed among users 115, functions, mobile devices 110, or display regions 205, 210. The parameters that are mentioned can likewise be provided with priorities on the basis of rules, with the result that it can be determined for example whether or not a first function whose priority is higher than that of a second function but whose allocated mobile device 110 has a lower priority than the mobile device 110 that is allocated to the second function can access the output apparatus 140 as a result before the second function. Priorities can also be determined or changed on the basis of events. For example, the priority of a function whose output changes can be higher than that of a function whose output does not change. The priority of a function can be temporarily increased when its output changes. It is preferred that the priorities and rules are designed in such a manner that controllability of the household appliance 105 is always ensured and, when in doubt, takes precedence over controllability of a function of a mobile device 110.

Figure 3:
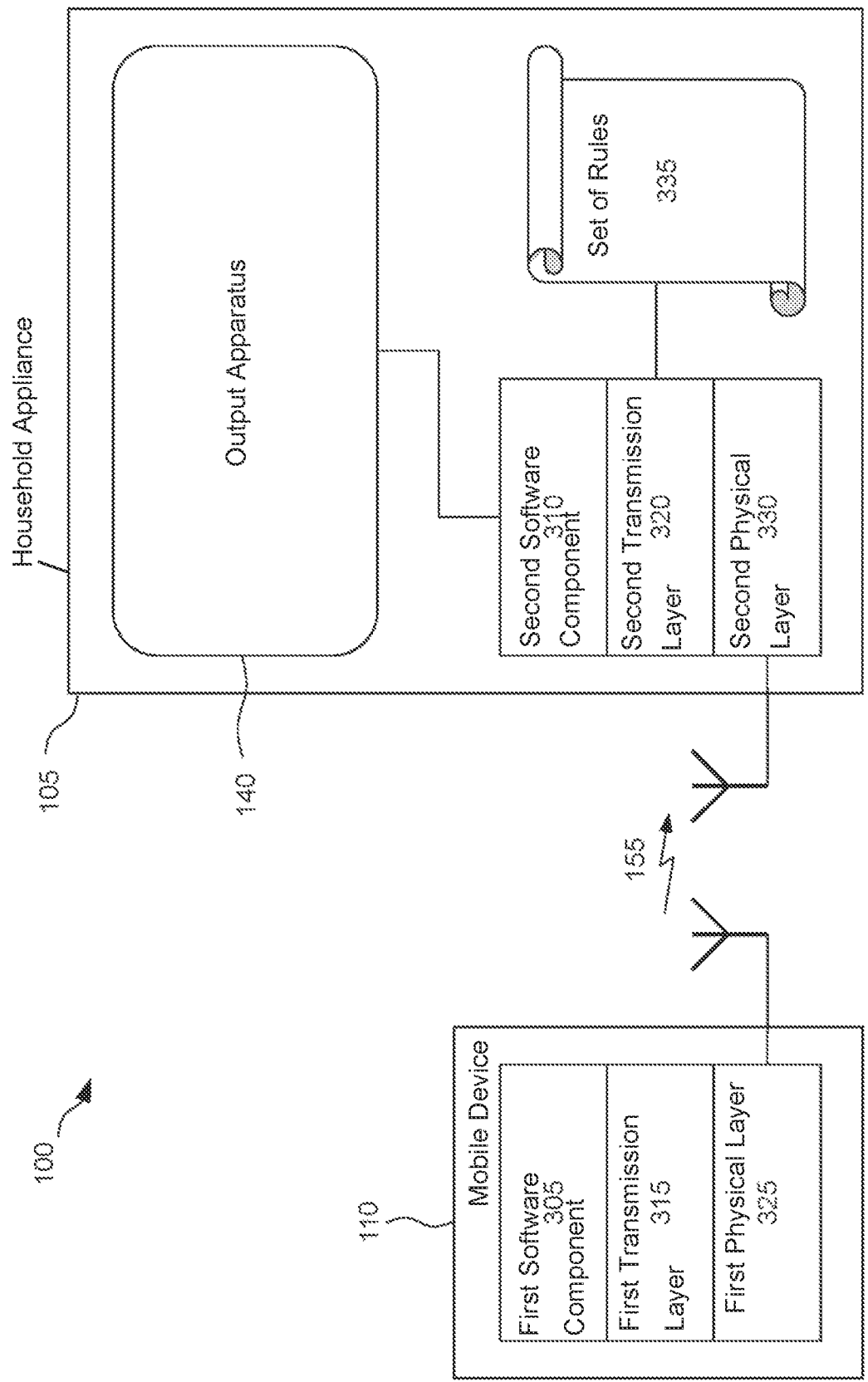
FIG. 3 shows exemplary communication between a mobile device and a household appliance.

FIG. 3 schematically illustrates a communication between a mobile device 110 and a household appliance 105. The illustrated communication relates to a transmission of an output from the mobile device 110 to the household appliance 105. However, an input at the household appliance 105 can also be handled and transmitted to the mobile device 110 in a corresponding manner.

A first software component 305 is provided in the mobile device 110 that generates an output. The output can include, for example, a text or a graphic. The software component 305 makes use of a layered abstraction of communication, such as that proposed for example in the ISO-OSI model.

The first software component 305 provides the output to a second software component 310, which is provided on the part of the mobile device 110 and can present the output to the output apparatus 140.

However, the transmission of the output does not occur directly between components 305 and 310; instead, the first software component 305 passes the output to an underlying first transmission layer 315, which transmits the output to a second transmission layer 320 on the part of the household appliance 105. The transmission layers 315 and 320 can be configured, for example, so as to control flow control, confirmation, or retransmission in the event of an error.

However, even between the transmission layers 315 and 320, direct communication occurs only in the abstract sense. In fact, the first transmission layer 315 passes data to be transmitted to a first physical layer 325, which wirelessly transmits the data via the data connection 155 to a second physical layer 330 on the part of the household appliance 105. The physical layers 325 and 330 can, for example, convert a conversion of bits into physical signals such as power or frequencies.

Although three layers 305, 315, 325 or 310, 320 and 330 are described in the present case in an exemplary manner, more or fewer layers can also be provided as desired.

It is proposed that, on the part of the household appliance 105, a set of rules 335 is provided that is used, for example, in the manner of a control list of a firewall, in order to determine whether or not an output that is received via the data connection 155 should be output on the output apparatus 140. As an example, the set of rules 335 is applied at the transmission layer 320. At this layer, meta-information about the mobile device 110, the first software component 305, a user that is associated with the mobile device 110, or transmission parameters can be available to be analyzed with respect to the set of rules 335.

Figure 4:
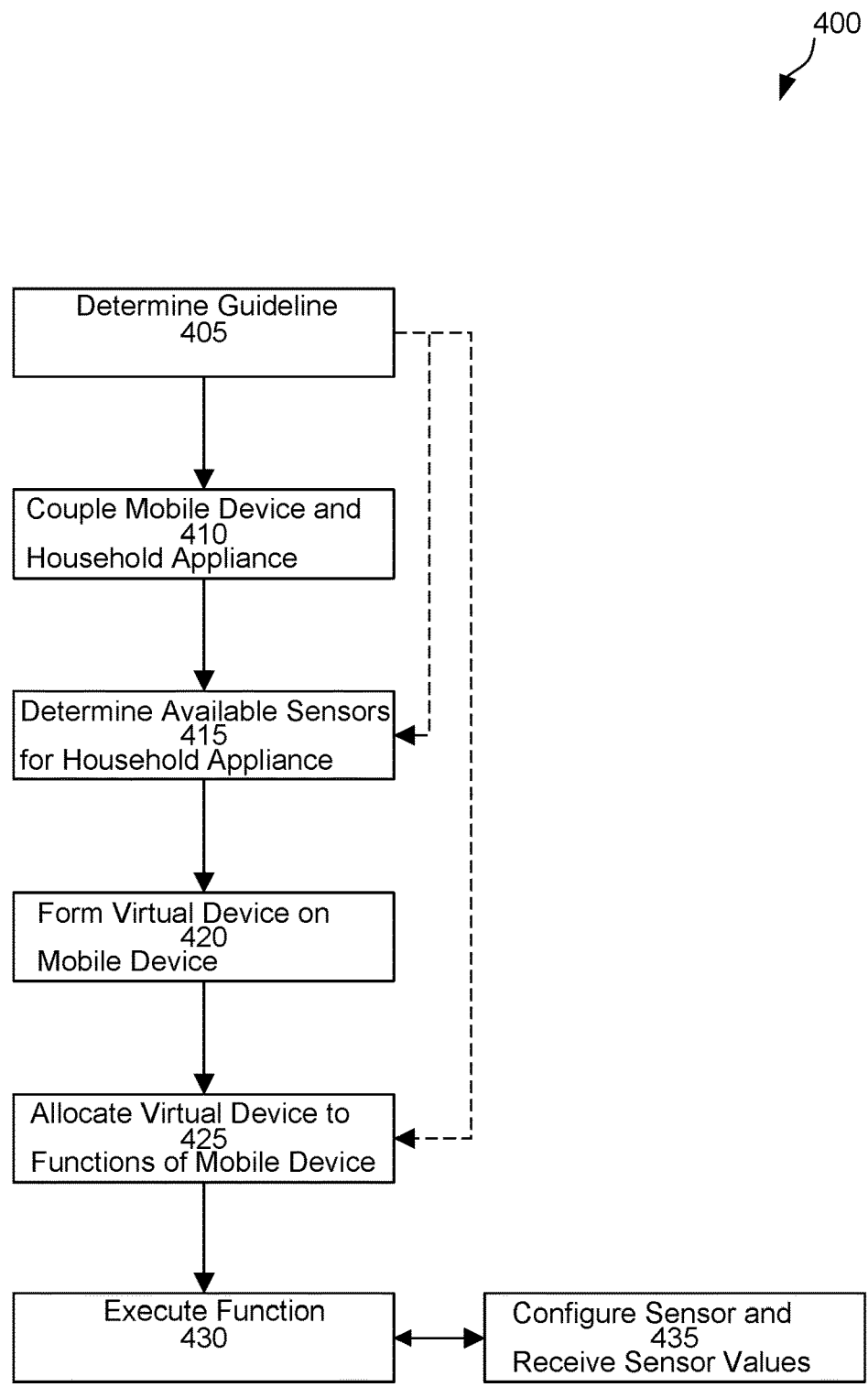
FIG. 4 shows a first method for controlling a household appliance.

FIG. 4 illustrates a flowchart of a first method 400 for controlling a household appliance 105. The method 400 can be executed in a distributed manner on the household appliance 105 and a mobile device 110.

In a step 405, a guideline can be determined, for example, by providing a predetermined guideline, registering an input from a user 115, or downloading a guideline from a central point 112.

In a step 410, the mobile device 110 and the household appliance 105 can be communicatively coupled with one another, for example, by establishing data connections 150, 155. In a step 415, it can be determined which sensors 142 are available for enabling on the part of the household appliance 105. This determination can be made in dependence upon the guideline with the result that it is not possible to enable each sensor 142 arbitrarily.

In a step 420, the mobile device 110 can form a virtual device that is configured so as to provide sensor values of a sensor 142 that is enabled on the household appliance 105. A virtual device can behave for a function or app that is running on the mobile device 110 in the same manner as an actual real device that is present locally on the mobile device 110. In a step 425, the virtual device can be provided to one or more functions of the mobile device 110. This can also be done in accordance with the guideline, with the result that not every function can receive all access rights or information about the sensor 142.

In a step 430, the function can be executed. For this purpose, in a step 435, the sensor 142 can be configured and sensor values of the sensor 142 can be received via the data connection 150, converted, filtered, or cleaned as appropriate in relation to the guideline, and provided to the function.

Figure 5:
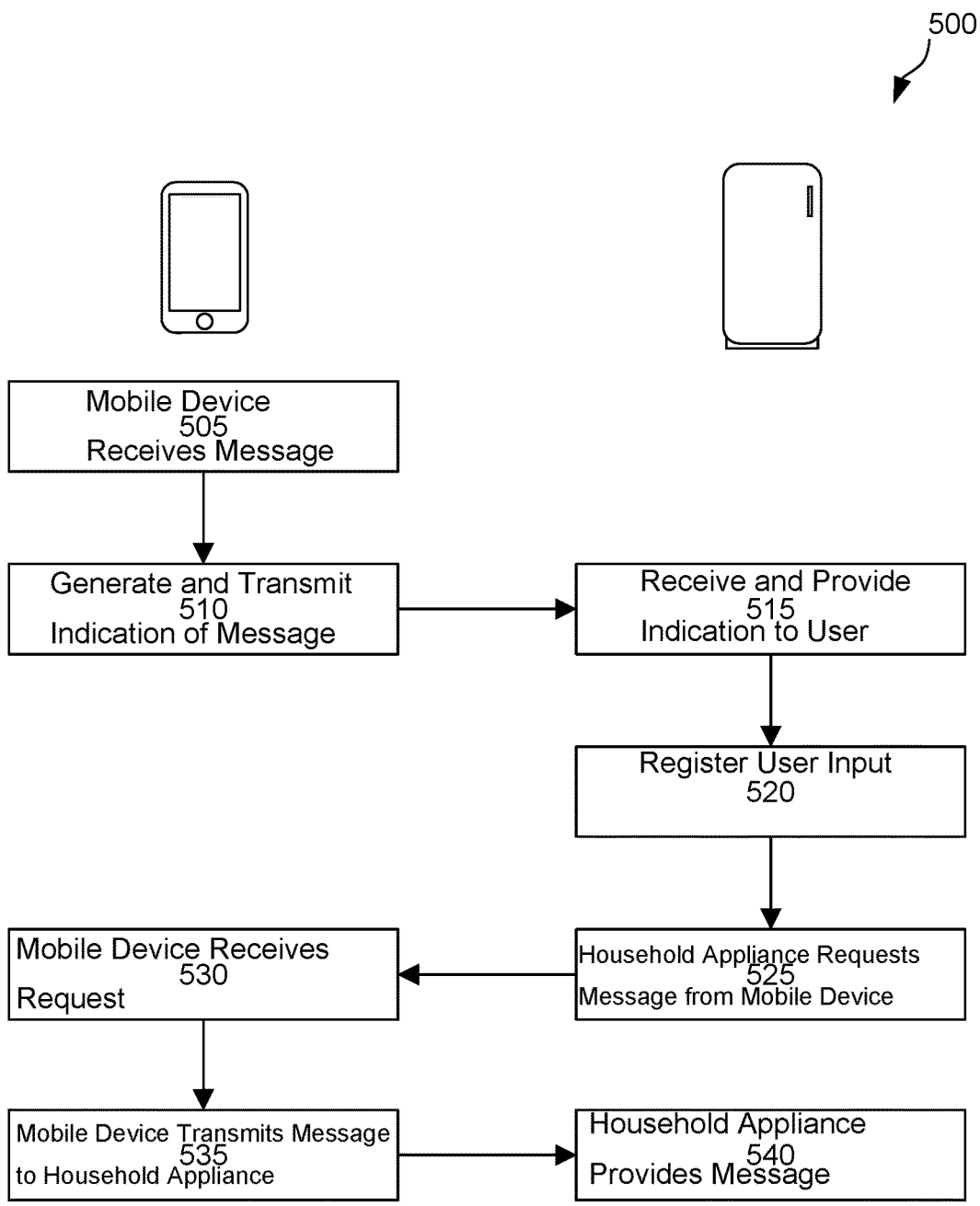
FIG. 5 shows a second method for controlling a household appliance.

FIG. 5 illustrates a flowchart of a second method 500 for controlling a household appliance 105. In the exemplary embodiment that is selected, steps that are allocated to the mobile device 110 are shown in a left-hand side region, and steps that are allocated to a household appliance 105 are shown in a right-hand side region. It is assumed that at the beginning of the method 500, a data connection 155 already exists from the mobile device 110 to the household appliance 105, and in particular the two devices are coupled to one another. The coupling can be made up if necessary at any point in the method 500. The second method 500 can in particular be combined with the method 400 in whole or in part.

In a step 505, the mobile device 110 can receive a message. In one embodiment, a notification is only received in response to a message that is available at an external point 112. In a step 510, an indication or notification of the message can be generated and transmitted to the household appliance 105. In a step 515, the household appliance 105 can receive the indication and can provide to a user 115, for example, by means of the output apparatus 140. Optionally, the output or presentation of the indication can be controlled by the household appliance 105 with respect to a predetermined guideline, which can be predetermined, downloaded from an external point 112, or adapted by a user 115.

In a continuation of the method 500, an input of a user 115 can be registered in a step 520 which indicates that the user would like to receive the message, which was indicated to the user, at the household appliance 105. In response, the household appliance 105 can request the message from the mobile device 110 in a step 525. The mobile device 110 can receive the request in a step 530 and transmit the message to the household appliance 105 in a step 535. The mobile device 110 can subject the message to inspection with reference to a guideline. A message can be discarded, adapted, or modified on the basis of the guideline.

In a step 540, the message can be provided by the household appliance 105 to the user 115, for example by means of the output apparatus 140. Prior thereto, the household appliance 105 can likewise subject the message to a check in relation to a predetermined guideline.

Figure 6:
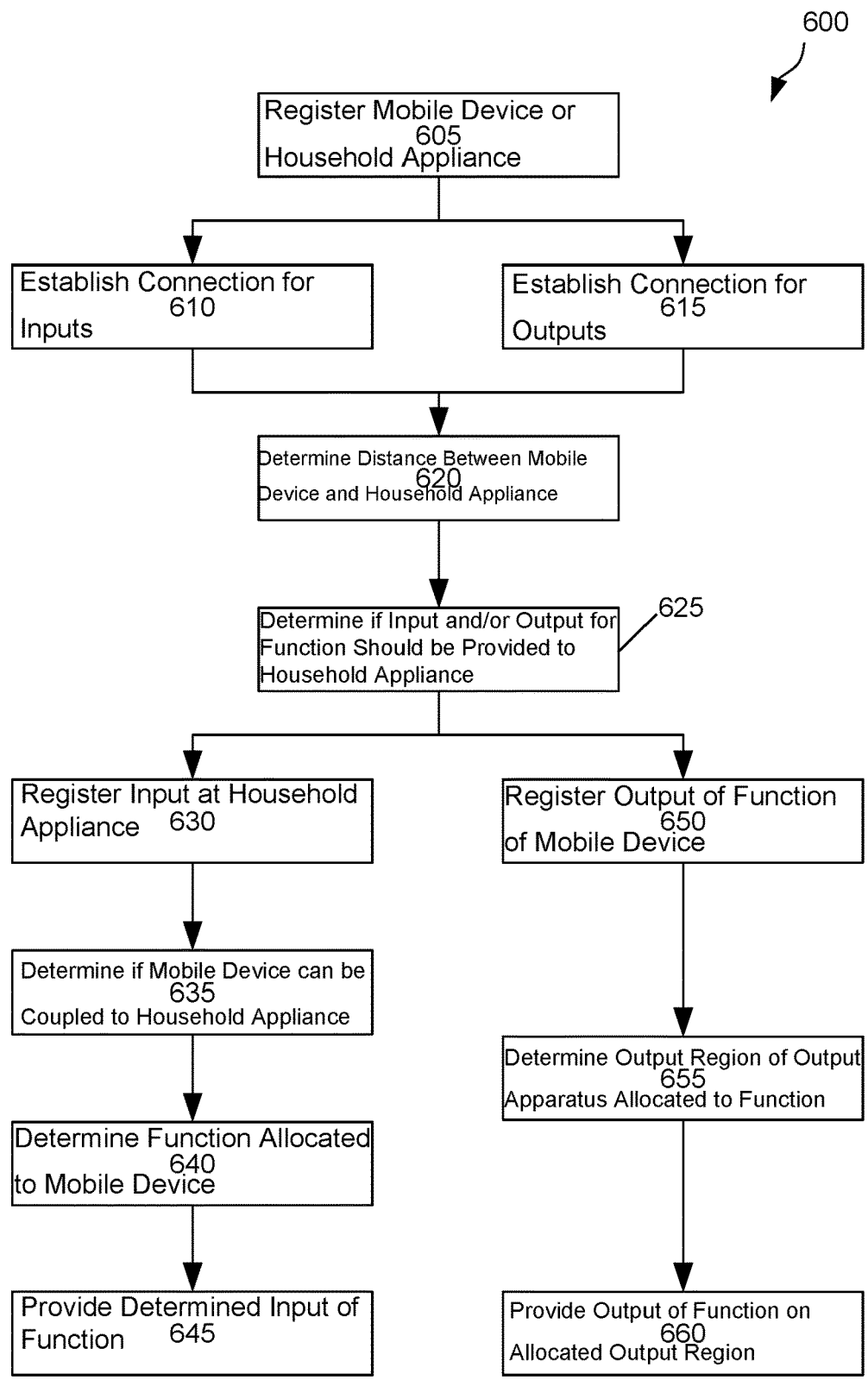
FIG. 6 shows a third method for controlling a household appliance.

FIG. 6 illustrates a flowchart of a third method 600 for controlling a household appliance 105. In a step 605, a mobile device 105 can be registered within a predetermined area around a household appliance 105 or vice versa. The area can be predetermined by a range of a communication technology that is used. This step can be performed on the part of the household appliance 105 or the mobile device 110.

In a step 610, a connection for inputs to a function of the mobile device 110 can be established, for example, by coupling the household appliance 105 or the control apparatus 125 as an input apparatus via a Bluetooth connection 150. In a step 615, a connection for outputs of the function of the mobile device 110 can be established, for example, by coupling the control apparatus 125 as a UI streaming server to the mobile device 110 via a WLAN connection 155.

The data connections 150, 155 preferably follow already established standards for remote output and input, respectively. Preferably, an openly documented standard is used that is further preferably not expected to be substantially changed or incompatibly extended for an extended period of time. This time can cover an expected serviceable life of the household appliance, for example approximately 10-30 years. Further preferably, a test exists to determine that the household appliance 105 implements the selected standard in a predetermined version without error. Compliance with the test can be certified. The wireless data connections 150, 155 can be separate and independent from one another, or one data connection 150, 155 can be used both for inputs as well as for outputs.

In a step 620, a distance between the household appliance 105 and the mobile device 110 can be determined, in particular on the basis of a transmission parameter of one of the data connections 150, 155. In a step 625, it can be determined whether an input and/or an output for the function should be provided to the household appliance 105. For this purpose, a confirmation from the user can be requested, for example. It can be determined whether the determined distance is within a predetermined area in which the redirection should occur. It can also be determined that an input or output of another user 115 currently has higher priority, in such a manner that the redirection cannot be available to the present user 115. The redirection can also be unavailable if an appliance state of the household appliance 105 requires direct and exclusive operation of the household appliance by means of the facilities 135, 140, for example because an excess temperature or otherwise imminent danger has been detected. If the redirection is to occur, the method 600 can thus proceed.

In a step 630, an input can be registered at the household appliance 105. In a step 635, a mobile device 110 that is allocated to the input can be determined if multiple mobile devices 110 can be coupled to the household appliance 105. In a step 640, a function that is allocated to the mobile device 110 can be determined if multiple functions of the mobile device 110 can accept inputs of the household appliance 105. In a step 645, the determined input of the function can be provided.

Concurrently, in a step 650, an output of a function of the mobile device 110 can be registered. In a step 655, an output region of the output apparatus 140 that is allocated to the function can be determined. If no output region is currently allocated to the function, existing output regions can be reallocated or a new output region can be designed for the function. In a step 660, the output of the function can be provided on the allocated output region.

Figure 7:
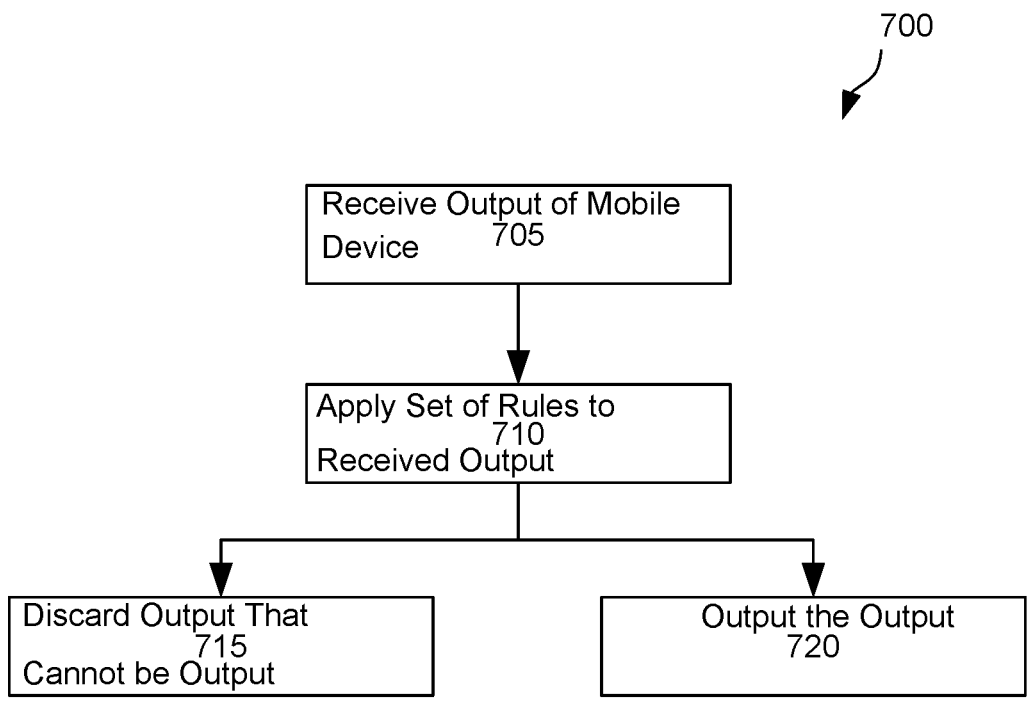
FIG. 7 shows a fourth method for controlling a household appliance.

FIG. 7 illustrates a fourth method 700 for controlling a household appliance 105, assuming that the household appliance 105 is coupled to the mobile device 110 by means of a wireless data connection 155.

In a step 705, an output of the mobile device 110 can be received. The output can generally include information that is directed to a user that can be provided by the mobile device 110 in the absence of coupling. With the aid of the coupling, the household appliance 105 or a control apparatus 125 that the household appliance comprises can be used as a remote output apparatus.

If a coupling between the household appliance 105 and the mobile device 110 does not yet exist, it can be established so that the data connections 150, 155 can be used. For example, the coupling can be uncoupled if a predetermined distance between the household appliance 105 and the mobile device 110 is exceeded. In one embodiment, coupling occurs only if the distance falls below a second threshold value. The second threshold value can be less than the first threshold value, with the result that the coupling can be established and terminated with a predetermined hysteresis. Flickering establishment and termination of the coupling can thus be prevented. In a further embodiment, hysteresis can also be provided for transferring a coupling from one household appliance 105 to another household appliance 105. In still another embodiment, a checkpoint can be predetermined that the mobile device 110 must pass before a coupling with a household appliance 105 is performed. When the mobile device 110 passes another checkpoint, an existing coupling with an allocated household appliance 105 can be terminated.

In a step 710, the set of rules 335 can be applied to the received output. In particular, a content of the output, a format of the output, or meta-information that is encountered in transmitting the output can or cannot allow the output to be provided on the output apparatus 140.

If it is determined that the output cannot be output, it can be discarded in a step 715. Additionally, the data connection 155 can be interrupted or terminated. An input that corresponds to the output can also be discarded.

Otherwise, if it was determined in step 710 that the output can be provided on the output apparatus 140, the output can be output in a step 720.

Figure 8:
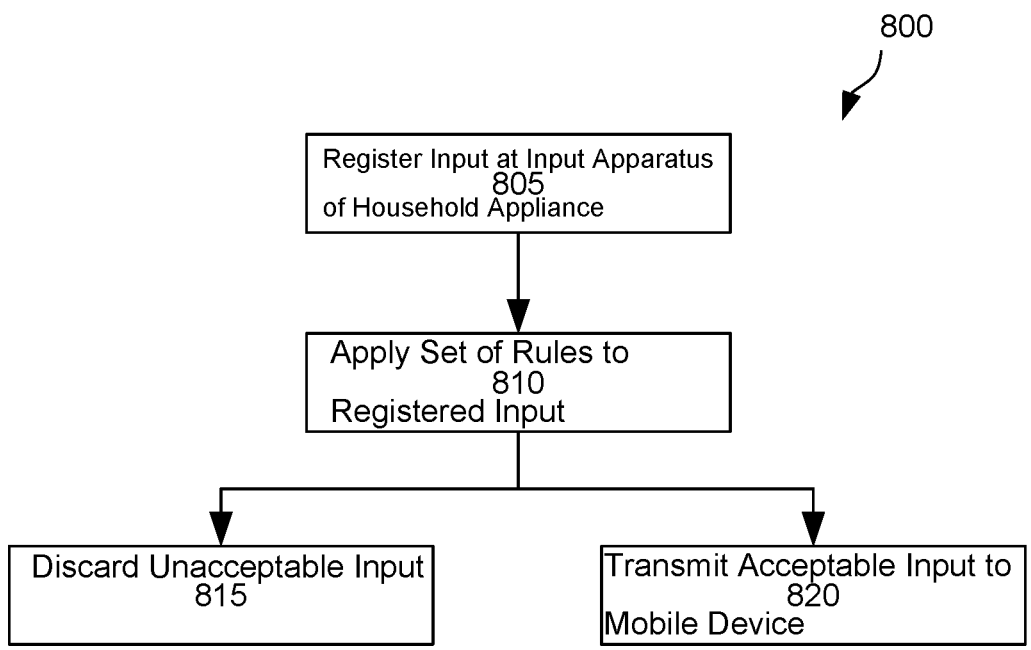
FIG. 8 shows a fifth method for controlling a household appliance.

FIG. 8 illustrates a fifth method 800 that can likewise run on a household appliance 105 that is coupled to a mobile device 110. In particular, the fifth method 800 can be executed in parallel or concurrently with any of the other methods that are described.

In a step 805, an input can be registered at the input apparatus 135 of the household appliance 105. In a step 810, the set of rules 335 can be applied to the registered input. In particular, a content and a context of the input can be verified. In particular, the input can be related to a mobile device 110, a software component 205, or a user that is associated with the mobile device 110.

If it has been determined that the input is not acceptable due to any aspect thereof on the basis of the set of rules 335, the input can thus be discarded in a step 815. Moreover, a corresponding output as described above in connection with one of the other methods can likewise be discarded. A data connection 155 to the mobile device 110 can be terminated or interrupted. Otherwise, if it is determined in step 810 that the input is acceptable, it can be transmitted to the mobile device 110 in a step 820.

Figure 9:
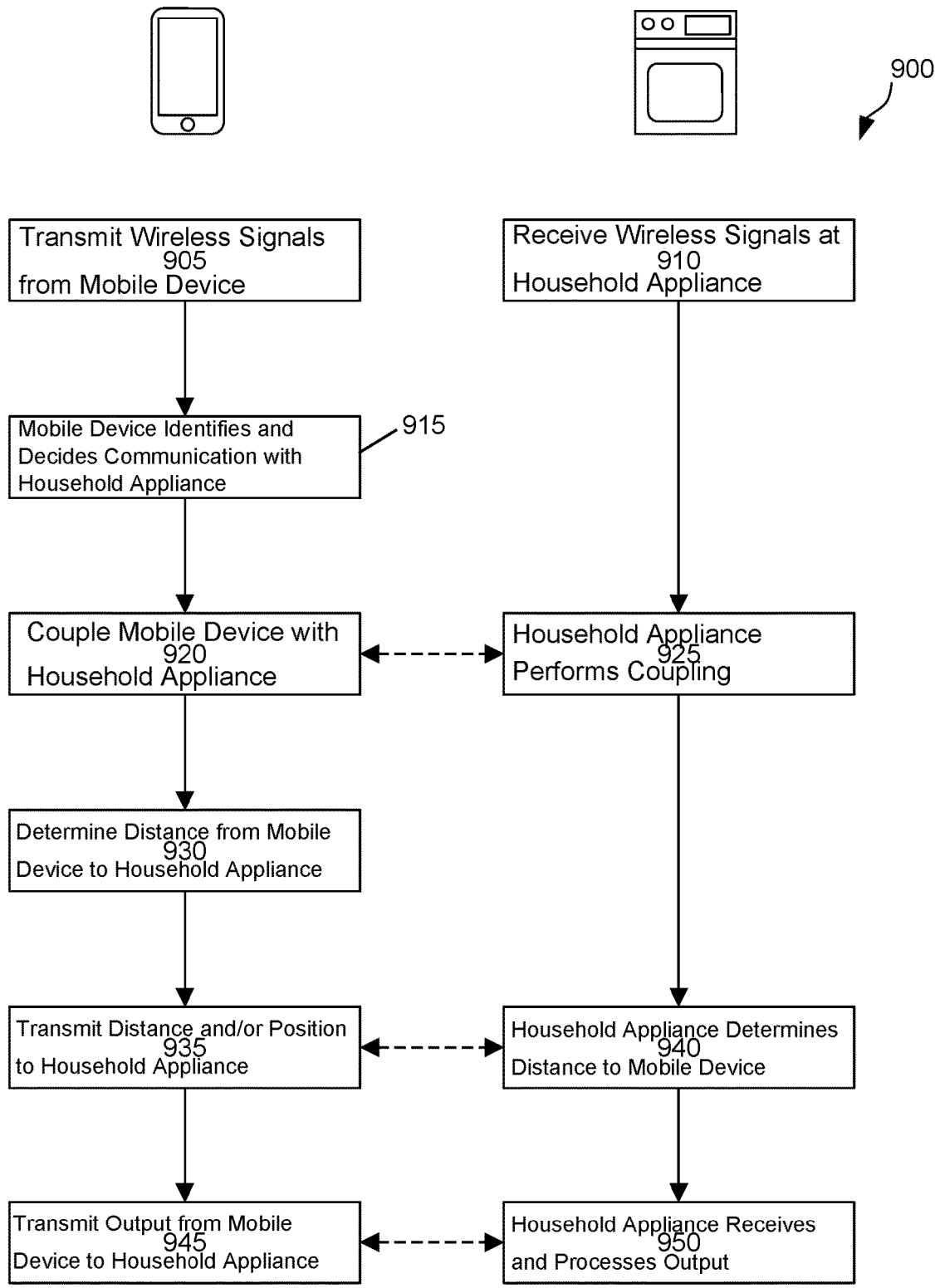
FIG. 9 shows a sixth method for controlling a household appliance.

FIG. 9 illustrates a flowchart of a sixth method 900. The method 900 can be executed in a distributed manner on different components, in particular a household appliance 105 and a mobile device 110. Exemplary steps that are usually allocated to the mobile device 110 are shown in a left-hand side region, steps that are usually allocated to the household appliance 105 are shown in a right-hand side region.

In a step 905, the mobile device 110 can transmit wireless signals, in particular electromagnetic signals, which can be received by the household appliance 105 in a step 910. The steps can also be performed in reverse, in such a manner that the household appliance 105 transmits signals that the mobile device 110 receives. The transmitting device 105, 110 can transmit the signals in the manner of a beacon so that the receiving device 105, 110 can better determine its distance to the transmitter. The determination of the distance can also be on the basis of parameters of a physical transmission or a bit transmission between the mobile device 110 and the household appliance 105.

In a step 915, the mobile device 110 can identify the household appliance 105 and decide whether to communicate with it with reference to a guideline. The guideline can be predetermined or downloaded from an external point 112. If communication is to occur, with reference to the guideline it is possible to determine which function or app is intended for the communication with the present household appliance 105. The determined function or app can be started or notified of information that is received.

In a step 920, a coupling is performed on the part of the mobile device 110 with the household appliance 105, which performs the coupling in a corresponding step 925. Coupling can include an exchange of transmission parameters, authentication, or certification of the communication partner. Following coupling, information can preferably be easily exchanged in both directions.

In a step 930, the mobile device 110 can determine its distance to the household appliance 105. In particular, this determination can be on the basis of parameters that form the basis of the communication, such as an RSS or an SNR. In a further embodiment, the mobile device 110 can also determine its geographic position, wherein the mobile device can fall back or not fall back to parameters of the communication. In a step 935, the determined distance and/or the determined position can be transmitted to the household appliance 105.

In a step 940, the household appliance 105 determines its distance to the mobile device 110. For this purpose, this can be on the basis of a previously received distance that is determined on the part of the mobile device 110. In one variant, the household appliance 105 can determine the distance in relation to its own position and a position of the mobile device 110 that the household appliance can have previously received from the mobile device 110. Alternatively, the household appliance 105 can determine the distance on the basis of parameters that form the basis of the communication as described above, for example an RSS or an SNR. In a further embodiment, a dedicated sensor is provided so as to determine the distance. Multiple sources of information can also be combined with one another so as to determine the distance.

In a step 945, the mobile device 105 can transmit an output to the household appliance 105 via the established data connection 150, 155. The latter can receive the output in a step 950 and process the output in dependence upon the determined distance. For example, the size, frequency, coloring, or orientation of a visual output can be determined in dependence upon the distance. The greater the distance, the clearer or more noticeable the output can be. An acoustic output can be adapted in its volume or a frequency spectrum, which is used, in dependence upon the distance. The processed output can then be output by means of the output apparatus 140.

The explanations given with reference to the figures are to be understood as purely illustrative and not limiting. Many modifications can be made to the embodiments that are illustrated in the figures without departing from the scope of protection of the invention that is described herein. In particular, the features of the embodiments can be freely combined with one another in order to thus provide further embodiments that are optimized for the intended application.

REFERENCE CHARACTERS

100 System
105 Household appliance
110 Mobile device
112 Central point
115 User
120 Communication facility
125 Control apparatus
130 Processing facility
135 Input apparatus
140 Output apparatus
142 Sensor
145 Wireless communication facility
150 First data connection (input)
155 Second data connection (output)
160 Storage apparatus
205 First display region
210 Second display region
215 Operating element
220 Graphical representation
225 Text region
305 First software component
310 Second software component
315 First transmission layer
320 Second transmission layer
325 First physical layer
330 Second physical layer
335 Set of rules
400 Method
405 Determine guideline
410 Couple mobile device to household appliance
415 Determine available sensors
420 Form virtual device
425 Provide virtual device
430 Execute function
435 Configure sensor, provide sensor values
500 Method
505 Receive push message
510 Generate, transmit indication
515 Receive, display indication
520 Determine user input
525 Request content
530 Receive request
535 Transmit message
540 Provide content
600 Method
605 Register mobile device
610 Establish connection for inputs
615 Establish connection for outputs
620 Determine distance
625 Input/output local?
630 Register input
635 Determine allocated mobile device
640 Determine allocated function
645 Provide input
650 Capture output
655 Determine allocated output region
660 Provide output
700 Method
705 Receive output
710 Apply set of rules
715 Discard output
720 Output output
800 Method
805 Capture input
810 Apply set of rules
815 Discard input
920 Transmit input
900 Method
905 Transmitting/receiving wireless signals
910 Transmitting/receiving wireless signals
915 Check guideline, start app
920 Coupling
925 Coupling
930 Determine position/distance
935 Transmit position/distance
940 Determine distance
945 Transmit output
950 Provide output

The invention claimed is:

1. A method, comprising steps of:
   wirelessly coupling a household appliance to a mobile device as a Bluetooth input apparatus; and
   allocating a sensor of the household appliance, as a local appliance of the mobile device, to a function running on the mobile device, the sensor being made available by an operating system of the mobile device as a virtual device.

2. The method according to claim 1, which further comprises:
   using the sensor to sample an area of the household appliance and to provide a sensor value; and
   transmitting the sensor value to the mobile device to supply the sensor value to the function.

3. The method according to claim 1, which further comprises allocating the sensor in dependence upon a predetermined guideline.

4. The method according to claim 3, which further comprises allocating the sensor to the function as controlled by a user of the mobile device.

5. The method according to claim 3, which further comprises obtaining the predetermined guideline from a central point.

6. The method according to claim 1, which further comprises controlling a sampling criterion of the sensor according to the function.

7. The method according to claim 1, which further comprises:
   using the mobile device to receive a message;
   transmitting an indication of the received message from the mobile device to the household appliance; and
   using the household appliance to provide the indication to a user.

8. The method according to claim 7, which further comprises carrying out the transmission in dependence upon a predetermined guideline.

9. The method according to claim 7, which further comprises adapting a transmitted content in dependence upon a predetermined guideline.

10. The method according to claim 7, which further comprises automatically carrying out the coupling when an indication is to be transmitted.

11. A household appliance, comprising:
    a sensor;
    a communication facility for wireless communication; and
    a processing facility configured to wirelessly couple the household appliance to a mobile device as a Bluetooth input apparatus;
    said sensor acquiring a sensor value to be supplied to the mobile device and said sensor being made available by an operating system of the mobile device as a virtual device.

12. A mobile device, comprising:
    a communication facility for wireless communication; and
    a processing facility configured to wirelessly couple a household appliance to the mobile device as a Bluetooth input apparatus, the household appliance having a sensor and being configured to allocate the sensor as a local appliance to a function running on the mobile device, the sensor being made available by an operating system of the mobile device as a virtual device.

13. A system comprising:
    a household appliance according to claim 11; and
    a mobile device including a communication facility for wireless communication, and a processing facility configured to wirelessly couple the mobile device to the household appliance having said sensor and configured to allocate the sensor as a local appliance to a function running on the mobile device.

* * * * *